United States Patent [19]

Isensee et al.

[11] Patent Number: 5,815,153
[45] Date of Patent: Sep. 29, 1998

[54] MULTIFUNCTION CONTROL WITH CHANGEABLE APPEARANCE

[75] Inventors: Scott Harlan Isensee, Georgetown; Craig Ardner Swearingen, Austin, both of Tex.

[73] Assignee: International Business Machines Corporation, Armonk, N.Y.

[21] Appl. No.: 753,122

[22] Filed: Nov. 20, 1996

[51] Int. Cl.[6] .................................................... G06F 3/00
[52] U.S. Cl. ........................................ 345/354; 345/351
[58] Field of Search ..................................... 345/326–358

[56] References Cited

U.S. PATENT DOCUMENTS

| | | | |
|---|---|---|---|
| 4,964,077 | 10/1990 | Eisen et al. | 345/337 |
| 4,984,152 | 1/1991 | Muller | 345/145 |
| 5,018,082 | 5/1991 | Obata et al. | 345/336 |
| 5,195,130 | 3/1993 | Weiss et al. | 379/98 |
| 5,261,044 | 11/1993 | Dev et al. | 395/159 |
| 5,276,795 | 1/1994 | Hoeber et al. | 345/353 |
| 5,287,448 | 2/1994 | Nicol et al. | 345/337 |
| 5,309,506 | 5/1994 | Alexander | 379/95 |
| 5,311,175 | 5/1994 | Waldman | 341/34 |
| 5,347,626 | 9/1994 | Hoeber et al. | 345/353 |
| 5,363,481 | 11/1994 | Tilt | 345/352 |
| 5,436,637 | 7/1995 | Gayraud et al. | 345/337 |
| 5,487,141 | 1/1996 | Cain et al. | 395/135 |
| 5,673,401 | 9/1997 | Volk et al. | 345/356 X |

OTHER PUBLICATIONS

"Dial 1–800–Internet", BYTE Magazine, Feb., 1996, pp. 83–88.

*Primary Examiner*—John E. Breene
*Attorney, Agent, or Firm*—Volel Emile; Mark E. McBurney

[57] ABSTRACT

A mechanism is provided for controlling the selection, in a single object, of multiple activities implemented by plural data structures. The invention provides a control mechanism for associating many selection points with many actions. That is, instead of associating data with an action, the present invention associates the action with the data. Therefore, the object of selection becomes the control element, rather than merely the initiator of the action. Since, the control is understood to be a mechanism for initiating an action, the period in which it is an object of selection must be indicated to a user. This will indicate to the user that the state of the control has changed. The present invention provides a control mechanism wherein a single object can change its appearance and represent different functions that can be implemented by a user. To do this, a mechanism is provided to associate the various representations of the object with the data that will implement the different functions. This mechanism may take various forms, such as a look up table, pointers, or the like.

11 Claims, 9 Drawing Sheets

After typing some text and then pressing the "Associate text" button the 10 pushbuttons then take on a new visual appearance. The pushbuttons could flash, or change color or whatever seems appropriate to indicate the user should click a pushbutton to associate the text from the entry field with the pushbutton control. Note: in the figure the 10 pushbuttons are given a thicker border to indicate this state.

Once a button is pressed or a timeout has elapsed, the buttons would return to their previous state and work like a pushbutton should.

Pushbuttons 1 through 10 with an entry field and where you can specify text to associate to one of the 10 pushbuttons. When you have typed the text to associate you press the "Associate Text" pushbutton. Prior to pressing the "Associate Text" pushbutton pushbuttons 1 through 10 when pressed do a certain behavior.

MULTIFUNCTION CONTROL WITH CHANGEABLE APPEARANCE

CROSS REFERENCE TO RELATED APPLICATIONS

The present application is related to the following applications: Ser. No. 08/753,081, entitled "Creating Real-World Objects" (Attorney Docket AT9-96-204); Ser. No. 08/753,082, entitled "Data Processing System and Method for Controlling a View of a Realistic Object in a Display Device" (Attorney Docket AT9-96-212); Ser. No. 08/753,077, entitled "Prioritization of Background Display During Animation" (Attorney Docket AT9-96-213); Ser. No. 08/753,076, entitled "System and Method for Maintaining Size and Position Relationships for Non-Rectangular Real World Objects" (Attorney Docket AT9-96-237); Ser. No. 08/753,124, entitled "Data Processing System and Method for Scaling a Realistic Object on a User Interface" (Attorney Docket AT9-96-240); Ser. No. 08/753,078, entitled "Data Processing System and Method for Viewing Objects on a User Interface" (Attorney Docket AT9-96-241); Ser. No. 08/753,079, entitled "Data Processing System and Method for Performing Automatic Actions in a Graphical User Interface" (Attorney Docket AT9-96-242); and Ser. No. 08/753,123, entitled "A Data Processing System and Method for Modifying a Size of a Realistic Object on a User Interface" (Attorney Docket AT9-96-246). All of the above applications are being filed on the same date as the present application and assigned to the assignee of the present application.

BACKGROUND OF THE INVENTION

The present invention relates to a data processing system for presenting a representation of real-world, non-standard, complex objects in a graphical user interface (GUI). More particularly, a process is utilized that allows an object to have more than one set of data associated with it, which may be used to perform distinct functions.

Object oriented programming is a known technology which encapsulates data and methods into a programming entity called an object. By protecting certain methods and data through a public interface, an object oriented program can insulate each component from changes to other components yet provide the needed functions with a minimum of reprogramming. For more background information on object oriented technologies, concepts and conventions, please see the following references, *Object Oriented Design with Applications*, Grady Booch (The Benjamin/Cummins Publishing Company, 1990) and *Object Oriented Software Construction*, by B. Meyer, (Prentice Hall, 1988).

Typically, graphical user interfaces present everything in terms of windows, which include items such as a size border, rectangular client, menu, title bar and the like. These items are not found in real-world objects, such as a telephone or a book that sits on a user's desk. Current data processing technology is moving towards displaying these real-world objects on the computer screen. It is very desirable to have the real-world object on the GUI desktop appear very similar to what a user experiences in real life.

There is commonly a need in graphical user interfaces (GUIs) for a user to assign data to customize an operation. For example, the action of pressing a button, or selecting an object represented by an icon will cause a certain functional activity to be performed. Customization of this functional activity occurs when a particular data structure is associated with the object. That is, an object may perform the function of sending a document to a printer. The data structure that is used to send the can be changed such that the document icon may send a document to another interconnected computer. However, in either case, there is one object and different data is associated with this object. To perform this association, a dialog is initiated that will cause the data to be received and ultimately assigned to a particular object to perform a specific action.

For a single object to perform a single activity, the previous dialog is sufficient. There is basically a one to many relationships that is developed. That is, one object can be associated with many actions. However, it would be desirable to have a case where a single object is capable of performing multiple activities. In this manner a user will have the option of choosing multiple selection points (e.g. softbuttons or the like) to perform multiple activities. Thus, a need exists for a system that allows many selection points to be associated with many data structures.

Therefore, it can be seen that a need exists for a system and method which provides a mechanism that indicates which data structures is to be associated with a particular selection point.

SUMMARY OF THE INVENTION

In contrast to the prior art, the present invention provides a mechanism for controlling the selection, in a single object, of multiple activities implemented by plural data structures.

Broadly, the present invention provides a control mechanism for associating many selection points with many actions. That is, instead of associating data with an action, the present invention associates the action with the data. Therefore, the object of selection becomes the control element, rather than merely the initiator of the action. Since, the control is understood to be a mechanism for initiating an action, the period in which it is an object of selection must be indicated to a user. This will indicate to the user that the state of the control has changed.

Thus, the present invention provides a control mechanism wherein a single object can change its appearance and represent different functions that can be implemented by a user. To do this, a mechanism is provided to associate the various representations of the object with the data that will implement the different functions. This mechanism may take various forms, such as a look up table, pointers, or the like.

Therefore, in accordance with the previous summary, objects, features and advantages of the present invention will become apparent to one skilled in the art from the subsequent description and the appended claims taken in conjunction with the accompanying drawings.

DETAILED DESCRIPTION OF THE PREFERRED EMBODIMENTS

The telephone object of the present invention is a user interface design for a new, real-world user interface style. It is built using C++ and implements a reusable framework. A shortcut function allows the properties page of the telephone's shortcut icon to assign a shortcut key. This will allow a user to access the phone at any time. For example, the shortcut key will bring the telephone to the top when it is covered by other windows. Also, the phone will automatically answer if it's ringing when the user presses the shortcut key.

Additionally, one embodiment of the telephone object of the present invention will allow the object to be fully displayed during moving and sizing. This dynamic display of the object during sizing can be implemented by using a software program such as "Plus" from Microsoft Corp). It is also possible to display the traditional outline box during resizing.

During dialing, the user can insert a pause by entering a comma (,) for a 2 second pause or semicolon (;) to wait for another dial tone.

Telephone numbers are often made up of names or acronyms that are easy to remember, but difficult to dial on a real phone (for example, 1-800-CALLIBM). With the telephone object of the present invention a user can just type the letters on the keyboard. The present invention translates the letters to the desired phone number, and automatically dials the number.

The telephone object of the present invention is also capable of combining speed dial numbers with numbers keyed in by the user. For example, if 9 must be dialed to get an outside line, a user can just enter the numeral 9 and then select the speed dial button.

The present invention is implemented such that a user can close the "object", if required by the specific operating system. However, the present invention supports operating systems wherein closing the object by the user is not a necessity. In a preferred embodiment the telephone object of the present invention supports closing the object as required by the majority of current operating systems, such as Windows 95 (available from Microsoft Corp). This closing, and other functions, is implemented through a pop-up menu. Just select the telephone object (e.g. by clicking a first mouse button over the object to see the pop-up menu, and then clicking a second button over the option to be selected by the user.

The telephone object of the present invention has been designed to work in much the same way as a physical telephone located on a desk, wall, car or pocket. But, unlike a physical telephone, it works through the computer. The present invention takes advantage of the functions that computers are so good at, such as remembering names and numbers, finding and entering (dialing) the number quickly. The present invention allows a user to answer and place calls without picking up a physical handset.

Some of the differences between the present invention and other telephone applications are that the telephone object of the present invention always displays the image of a real telephone regardless of how the user is currently interacting with it. Further, the object of the present invention does not need a window border around it; it sits right on your desktop. It is recognizable at any size, and can be made as big or as small as desired without interfering with its functions. Even when the object is displayed as an icon, it can be used to answer calls or dial the user's speed-dial numbers, or to dial a number manually using the keyboard.

A user can dial numbers manually either by clicking on the phone object's keypad with the mouse, or by using the computer's number keys. (You can even type in the letters for telephone numbers such as 1-800-CALLIBM.) When a person being called answers, just start talking. The present invention telephone object uses the microphone and speaker provided with the user's computer system such that hands-free conversation is possible. When the user has completed the telephone conversation click on the handset portion of the object to hang up.

To receive an incoming call, the user answers by again selecting the handset portion of the object and begin talking.

The present invention also includes a speed-dial function. The speed-dial can be set during the time period when a telephone conversation is occurring or after the call is finished. The speed-dial may be set to allow access to numbers which are called often, or to emergency numbers. To set the speed-dial function, click on the handle portion of the drawer, which is located at the bottom edge of the telephone object. The drawer will slide open, displaying an area where the speed-dial buttons can be set. That is, type the name of the person, or entity, to which speed-dial access is desired, then fill in the desired telephone number in the Number field and press the Add Name button. The name and number will appear in the list above the entry fields. Next, press the Set Speed Dial key. In response, the speed-dial buttons will flash. Select the button you want to assign to this speed-dial number. The name and number entered by the user will appear beside its associated speed-dial button. When the speed-dial number is set, the user selects the handle of the drawer to return it to its original position.

The telephone object of the present invention can be displayed as it first appeared, with both the number pad and the speed-dial buttons, or in a simpler state, the base function view. To change between these presentations, a toggle switch located on the telephone object just above the speed-dial buttons is selected. In order to stretch or shrink the telephone object, the user can move the mouse pointer over any edge of the phone object. The pointer will change to a diagonally oriented sizing pointer. While this new pointer is showing, press down the left mouse button and drag the edge of the telephone object to change its size. No matter how large or small you make it, the telephone object can still be used.

In a preferred embodiment, the present invention is implemented in the C++ programming language using object oriented programming techniques. C++ is a compiled language. The programs are written in human readable script and this script is provided to another program called a compiler to generate a machine readable numeric code which can be loaded into, and directly executed by the computer. The C++ language possesses certain characteristics which allow a software developer to easily use programs written by others while still provided a great deal of control over the reuse of programs to prevent their destruction or improper use. The C++ language is well known and many articles and text are available which describe the language in detail.

As known by those skilled in the art, object oriented programming techniques involve the definition, creation, use and instruction of "objects". These objects are software entities comprising data elements and routines, or methods, which manipulate the data elements. The data and related methods are treated by the software as an entity as an be created, used and deleted as such. The data and functions enable objects to model their real world equivalent entity in terms of its attributes, which can be presented by the data elements, and its behavior which can be represented by its methods.

Objects are defined by creating "classes" which are not objects themselves, but which act as templates which instruct a compiler how to construct the actual object. For example, a class may specify the number and type of data variables and the steps involved in the functions which manipulate the data. An object is actually created in the program by means of a special function called a constructor which uses the corresponding class definition and additional information, such as arguments provided during object creation, to construct the object. Objects are destroyed by a special function called a destructor.

Many benefits arise out of three basic properties of object oriented programming techniques, encapsulation, polymorphism and inheritance. Objects can be designed to hide, or encapsulate, all or a portion of, the internal data structure and the internal functions. More particularly, during program design, a program developer can define objects in which all or some of the data variables and all or some of the related methods are considered "private" or for use only by the object itself. Other data or methods can be declared "public" or available for use by other software programs. Access to the private variables and methods by other programs can be controlled by defining public methods which access the object's private data. The public methods form an interface between the private data and external programs. An attempt to write program code which directly accesses the private variables causes a compiler to generate an error during program compilation. This error stops the compilation process and prevents the program from being run.

Polymorphism allows objects and functions which have the same overall format, but which work with different data, to function differently to produce consistent results. For example, an addition method may be defined as variable A+ variable B, (A+B). The same format can be used whether the A and B are numbers, characters or dollars and cents. However, the actual program code which performs the addition may differ widely depending on the type of variables which comprise A and B. Thus, three separate method definitions can be written, one for each type of variable (numbers, characters and dollars). After the methods have been defined, a program can later refer to the addition method by its common format (A+B) and, during compilation, the C++ compiler will determine which of the three methods to be used by examining the variable types. The compiler will then substitute the proper function code.

A third property of object oriented programming is inheritance which allows program developers to reuse pre-existing programs. Inheritance allows a software developer to define classes and the objects which are later created from them as related through a class hierarchy. Specifically, classes may be designated as subclasses of other base classes. A subclass "inherits" and has access to all of the public functions of its base classes as though these functions appeared in the subclass. Alternatively, a subclass can override some or all of its inherited functions or may modify some or all of its inherited functions by defining a new function with the same form.

The creation of a new subclass borrowing the functionality of another class allows software developers to easily customize existing code to meet their particular needs.

Although object oriented programming offers significant improvements over other programming concepts, program development still requires significant outlays of time and effort, especially if no pre-existing software programs are available for modification. Consequently, a set of predefined, interconnected classes are sometimes provided to create a set of objects and additional miscellaneous routines which are all directed to performing commonly encountered tasks in a particular environment. Such predefined classes and libraries are typically called "frameworks" and essentially provide a prefabricated structure as a basis for creating a working application program.

For example, a framework for a user interface might provide a set of predefined graphic interface objects which create windows, scrollbars, menus and the like, and provide the support and "default" behavior for these graphical interface objects. Since many frameworks are based on the object oriented techniques, the predefined classes can be used as base classes and the built in default behavior can be inherited by developer defined subclasses and either modified or overridden to allow developers to extend the framework and create customized solutions in a particular area of expertise. This object oriented approach provides a major advantage over traditional programming since the programmer is not changing the original program, but rather extending the capabilities of the original program. In addition, the framework provides architectural guidance and modeling and, at the same time, frees the developers to supply specific actions unique to the problem domain.

Therefore, those skilled in the art will understand how the present invention is implemented using object oriented programming techniques as described above.

Figure 1:
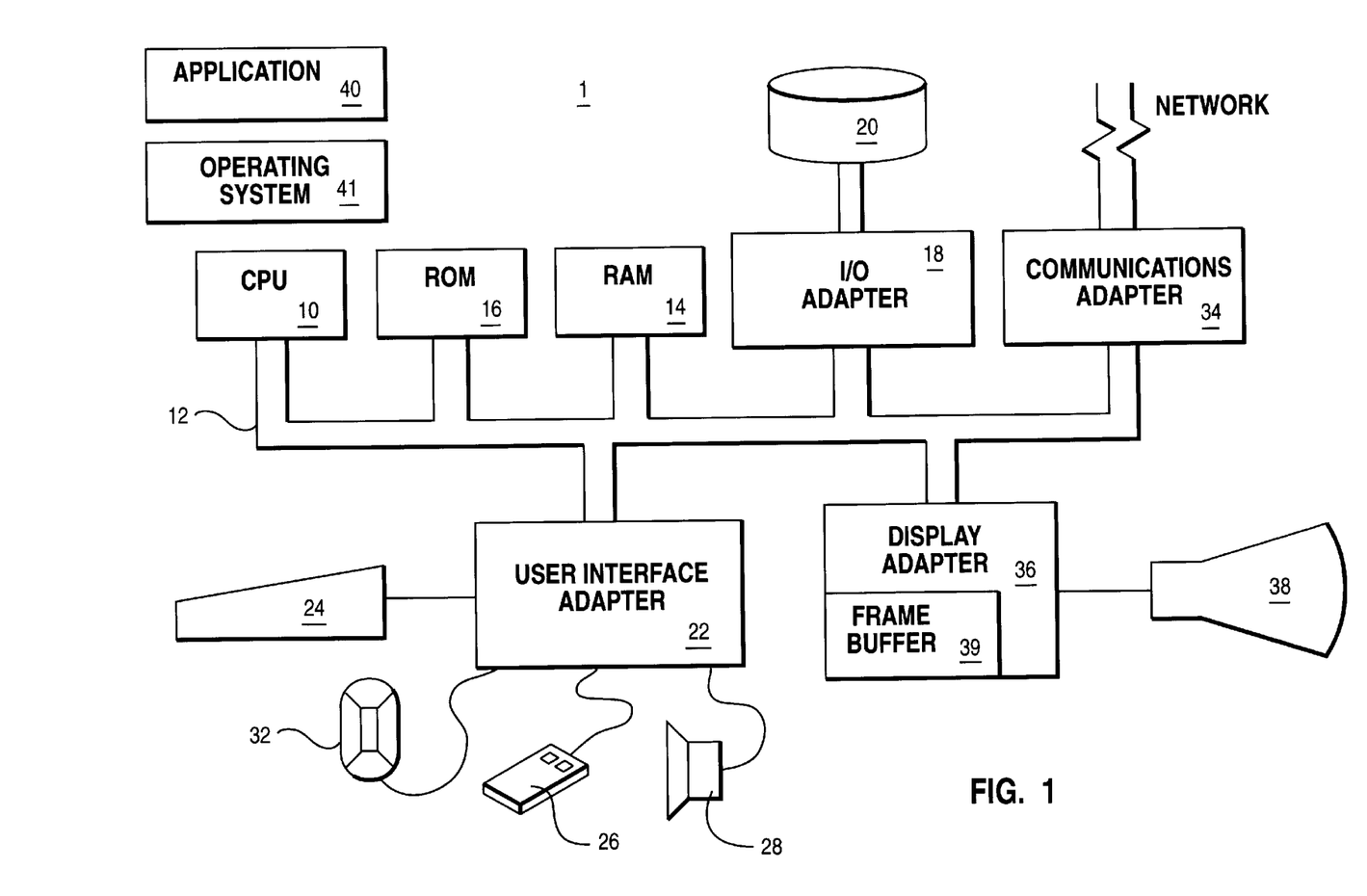
FIG. 1 is a block diagram of a data processing system including a central processing unit (CPU) which is capable of implementing the present invention.

Referring to FIG. 1, a typical data processing system is shown which may be used in conjunction with the present invention. A central processing unit (CPU), such as one of the PowerPC microprocessors available from IBM Corporation (PowerPC is a trademark of IBM) is provided and interconnected to various other components by system bus 12. An operating system 41 runs on CPU 10 and provides control and is used to coordinate the function of the various components shown in FIG. 1. Operating system 41 may be one of the commercially available operating systems such as DOS, or the OS/2 operating system available from IBM Corporation (OS/2 is a trademark of the IBM Corporation). A program application 40 runs in conjunction with operating system 41 and provides output calls to the operating system 41 which implements the various functions to be performed by the application 40.

A read only memory (ROM) 16 is connected to CPU 10, via bus 12 and includes the basic input/output system (BIOS) that controls the basic computer functions. Random access memory (RAM) 14, I/O adapter 18 and communications adapter 34 are also interconnected to system bus 12. It should be noted that there is software components including the operating system 41 and application 40 are loaded into RAM 14 which is the computer system's main memory. I/O adapter 18 may be a small computer system interface (SCSI) adapter that communicates with the disk storage device 20, i.e. a hard drive. Communications adapter 34 interconnects bus 12 with an outside network enabling the data processing system to communicate with other such systems over a local area network (LAN), wide area network (WAN), or the like. Input/output devices are also connected to system bus 12 via user interface adapter 22 and display adapter 36. Keyboard 24, trackball 32, mouse 26 and speaker 28 are all interconnected to bus 12 through user interface adapter 22. Display adapter 36 includes a frame buffer 39 which is a storage device that holds a representation of each pixel on the display screen 38. Images may be stored in frame buffer 39 for display on monitor 38 through various components such as a digital to analog converter, (not shown) and the like. By using the aforementioned I/O devices, a user is capable of inputting information to the system through the keyboard 24, trackball 32 or mouse 26 and receiving output information from the system via speaker 28 and display 38.

Figure 2:
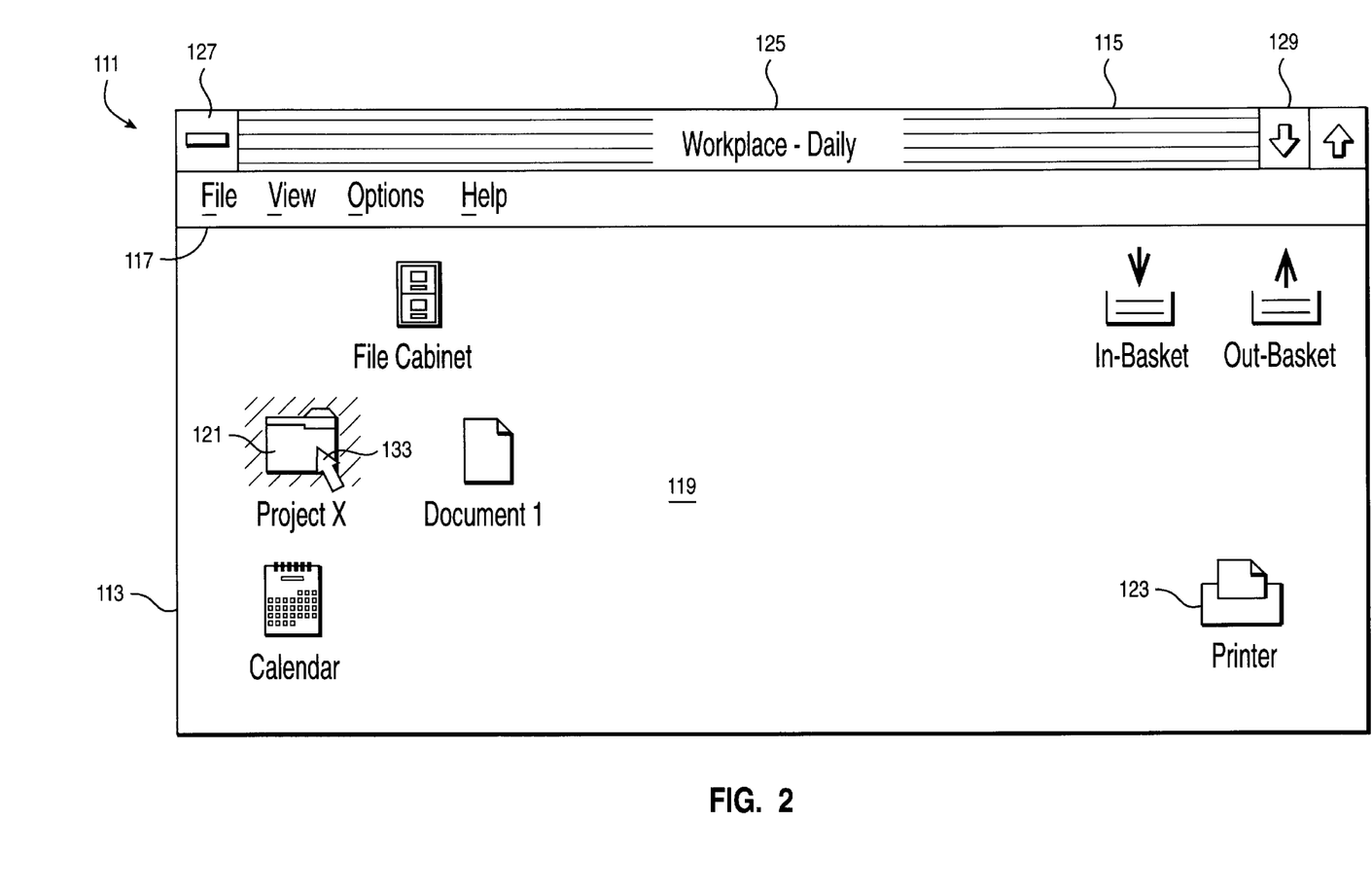
FIG. 2 shows a typical GUI with a workplace window having the various objects that are included on the user's workplace.

Referring to FIG. 2, the window is designated generally by the numeral 111. Window 111 includes a border with frame 113 that forms the outer boundary of the window. Contained within border 113 are a title bar 115 and an action bar 117. The remainder of window 111 consists of a client area 119, which is populated with a plurality of icons, including a folder icon 121, which is labeled "project X", and a printer icon 123.

Title bar 115 includes a window title 125 which identifies the window, a system menu icon 127 and window sizing icon 129. System menu icon 127 allows the user to display a pull-down menu containing actions that the user can perform on the window. Such actions are related to the window itself and not to the object that is displayed in the window. For example, actions include MOVE, which allows the user to reposition the window on the screen, MINIMIZE, which reduces the window's size, and MAXIMIZE, which enlarges the window to the size of the screen. Window sizing icon 129 provides a fast way to use a mouse or pointing device 133 to perform the actions of MINIMIZE and MAXIMIZE without requiring a menu.

Action bar 117 contains a list of the actions of the application shown in the window. Each action in the list in the action bar has an associated pull-down menu to list the individual actions that are contained within each general action listed in the action bar 117. For example, the FILE pull-down enables the user to work with files through actions that manipulate the file as a whole. The individual actions contained within the FILE action include NEW, which allows users to create a new file, and SAVE, which writes the existing file to a storage device.

Figure 3:
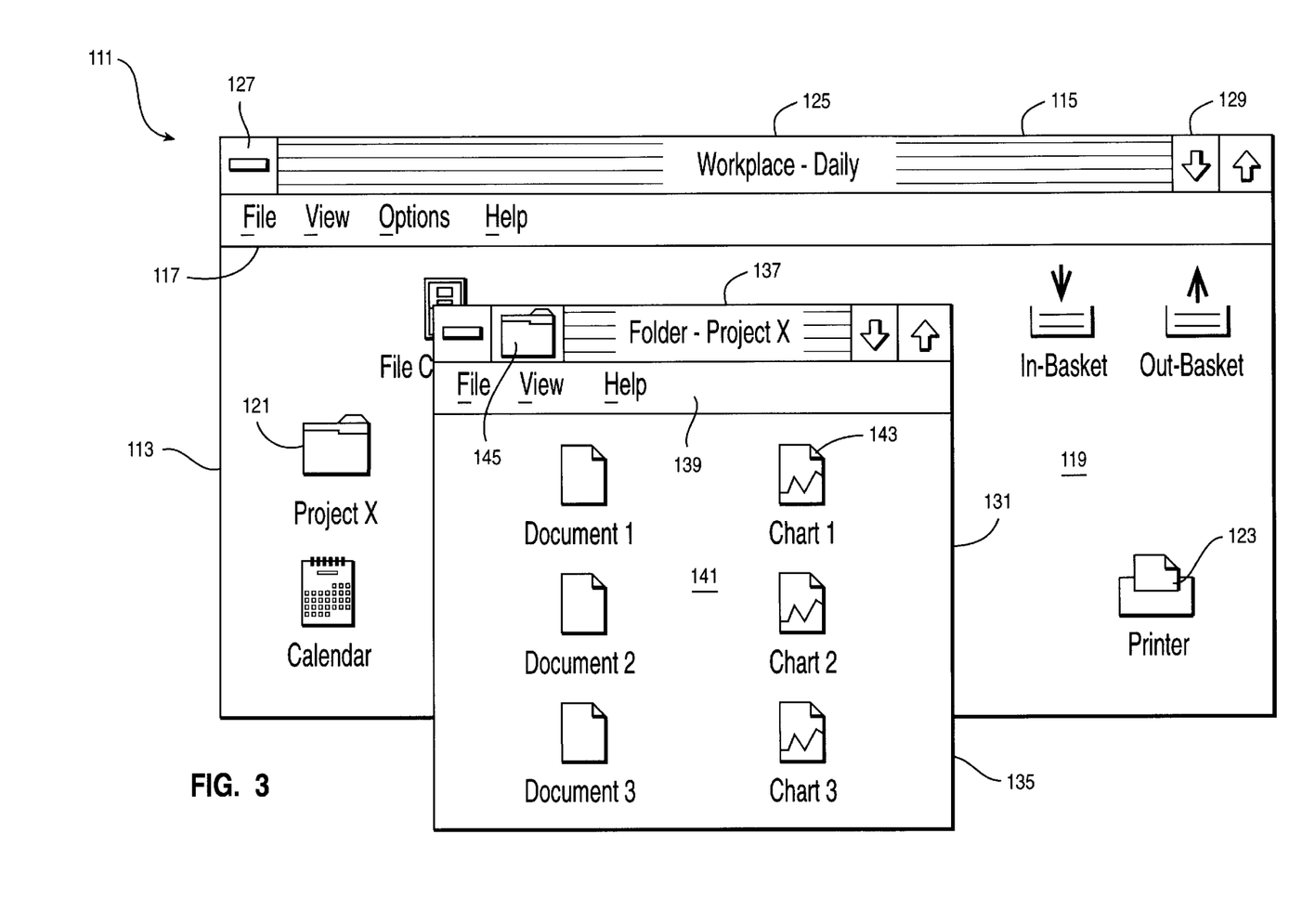
FIG. 3 is a more detailed representation of the GUI of FIG. 2 wherein the user has opened one of the objects on the workplace such that a window associated with that particular object is now displayed.

Turning now to FIG. 3, there is shown in addition to window 111, an object window 131. Object window 131 contains the contents of the "project X" folder represented by icon 121. Window 131 was opened by operating the pointer 133 to open icon 121.

Window 131 is similar to window 111 in that it includes a frame 135, a title bar 137, an action bar 139, and a client area 141 that is populated with a plurality of document and chart icons, including a "chart 1" icon 143. Title bar 137 of window 131 includes a title bar mini-icon 145 which is a copy of "project X" icon 121. Window title bar mini-icon 145 is placed in the title bar, rather than in the client area 141 of window 131, but is also capable of being directly manipulated by the user.

Figure 4:
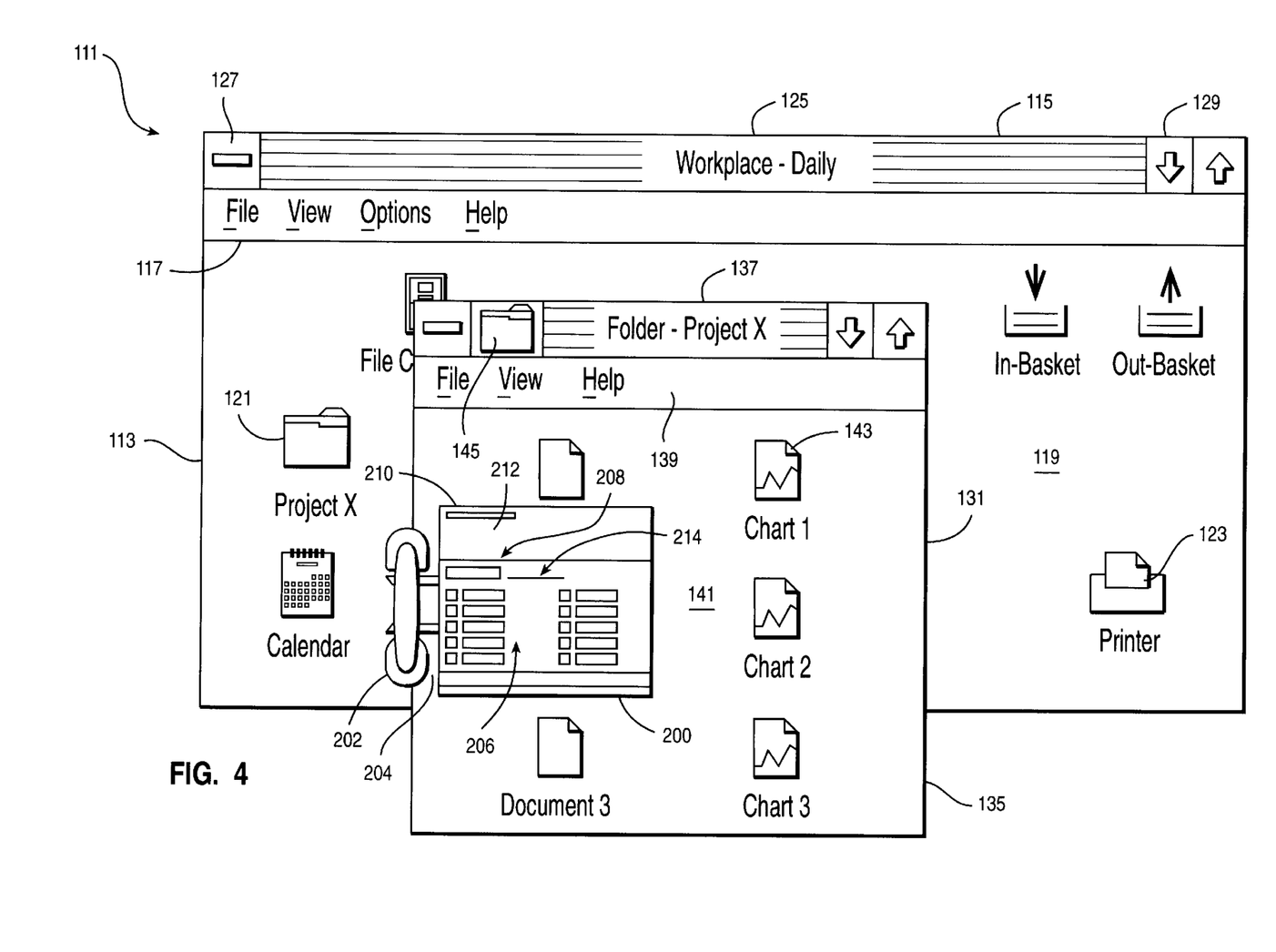
FIG. 4 is another detailed representation of the GUI of FIG. 2 showing the workplace window, the window corresponding to the open object of FIG. 3 and the real-world object of the present invention.

Referring to FIG. 4, workplace window 111 is once again shown having object window 131 opened such that a user can interact with the document associated with Project X. An additional window 200 has also been opened which is in the form of a "real world" window. In this example, real world object 200 is a representation of a telephone. It can be seen that telephone object 200 is surrounded by an irregularly shaped frame 210 which encompasses the object. Those skilled in the art will understand that FIG. 4 merely shows a telephone object as an example. Thus, the present invention is not limited to telephone objects, but contemplates all real world type objects which can be created using the system and methods of the present invention.

Telephone object 200 is seen to include a handset 202, speed dial functions 206 and a toggle switch 208. Further, it can be seen that the telephone object window 200 is irregularly shaped and includes curved and rounded edges which are known to be extremely difficult to render on the display of a data processing system. For example, it can been seen that the area 204 is not part of the telephone object 200, but is substantially enclosed by the distance between the handset and the body of the telephone object 200.

Further, it should be noted that telephone object 200 is not merely a bitmap representation of a telephone, but is a functional window in the same manner as workplace window 111 and object window 131. For example, the telephone may be answered upon receipt of an incoming call by clicking on handset 202. Additionally, a telephone number can be dialed by selecting one of the names associated with speed dial functions 206. An entry portion 212 allows a user to enter the number or numbers to be dialed when placing an outgoing call which has not been set up for speed dialing. A volume control 214 is provided as a slide switch that allows a user to control the sound volume which another party participating in a telephone call using object 200 can be heard. The preceding functions are given as examples of the types of controls available to be used when object 200 is a real world working telephone. Of course, other functions would be present when the object emulates other real world items, such as a fax machine, compact disk players, or the like.

Therefore, it can be seen when considering the functional elements of object 200 that this telephone represents an operational window in the same manner as window 111 and 131. However, the real world object 200 does not include such control items as action bar 117, title bar 137, action bar 139, window sizing icons 129 or the like. That is, the functionality provided in a conventional window by such items as title bars, action bars and pull-down menus, is provided by the real world functional controls of, in this case, a telephone. For example, to place a call the user clicks on handset 202 when using the present invention. In normal real world calling, the user would physically pick up the handset to begin speaking. Thus, there is a direct correlation between the action that a user of the present invention implements and the real world action that a person placing a telephone call on a physical telephone will make. Of course, the actions provided by telephone object 200 could be implemented in a non-real world object through the use of action bars, pull-down menus and selection of various operational actions, however, this conventional technique would require additional user actions and time before the desired result is obtained (placing a telephone call).

Figure 5A:
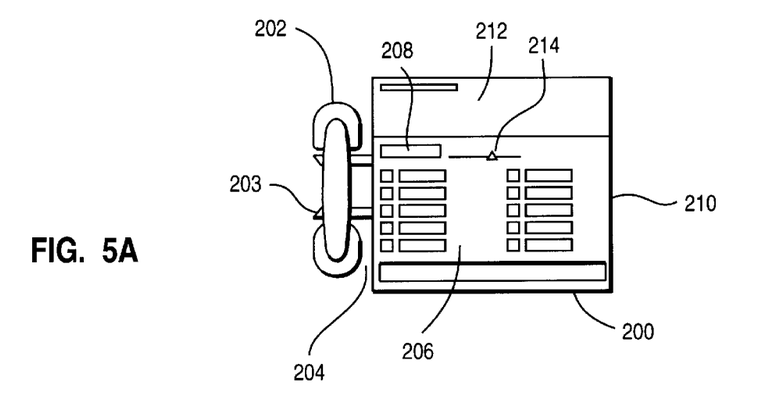
FIGS. 5A, 5B and 5C are various representations of the real-world object of the present invention in different functional states.

Next turning to FIG. 5, three separate telephone objects 200 are shown at various operational stages. In FIG. 5A, phone object 200 is shown essentially as was previously described with regard to FIG. 4. Therefore, FIG. 5A will not be described again at this time.

Figure 5B:
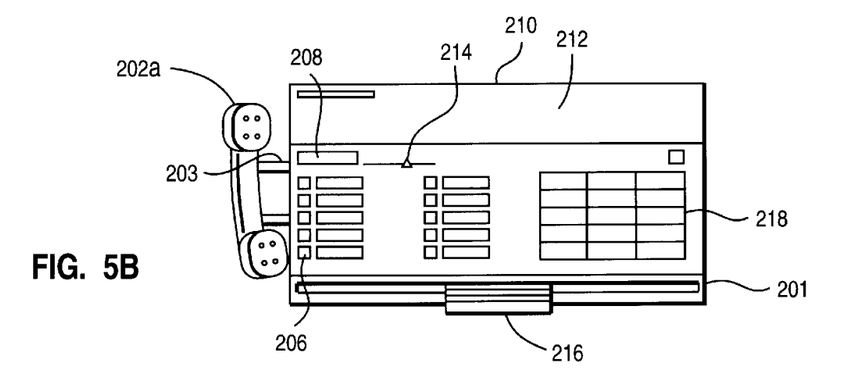

FIG. 5B is an enlarged version of telephone object 200 and shown by reference numeral 201. In addition to the various components shown by telephone object 200 of FIG. 5A, object 201 includes a number pad 218 which allows a user to enter telephone numbers to be called.

Additionally, entry pad 218 includes a redial, flash and mute buttons for performing other functions associated with a real world telephone. Again, toggle switch 208 is shown which is used to display a different representation of the telephone object 201, such as changing between a two-dimensional and three-dimensional object. Handset 202a is shown in the active state since it is turned to face a user and is not shown as resting on cradle 203. A pullout drawer handle 216 is shown which allows additional functions to be presented to a user of telephone object 201. By selecting the arrow associated with pullout drawer 216, drawer 228 is opened. In this case, the functions included in drawer 228 relate to setting speed dial numbers and buttons 206. Name field 220 allows a user to enter the name of the person to be added to one of the speed dial buttons 206. Number field 222 allows a user to enter the telephone number to be associated with the name of the person previously entered in field 220. The name and number is then included in a list box 226 which associates the name and telephone number with one another. Functional keys 224 then allow the user to associate the entered name and number with one of the speed dial buttons 206. Additionally functional buttons 224 allow a user to select various operations such as dialing the person just added to the speed dial function, delete a person's name and number from the speed dial function, or the like. Upon completion of the speed dial activity, a user selects drawer tab 216 and the drawer is then closed such that the telephone object 201 of FIG. 5C returns to the appearance shown in FIG. 5b, as previously described.

Figure 6:
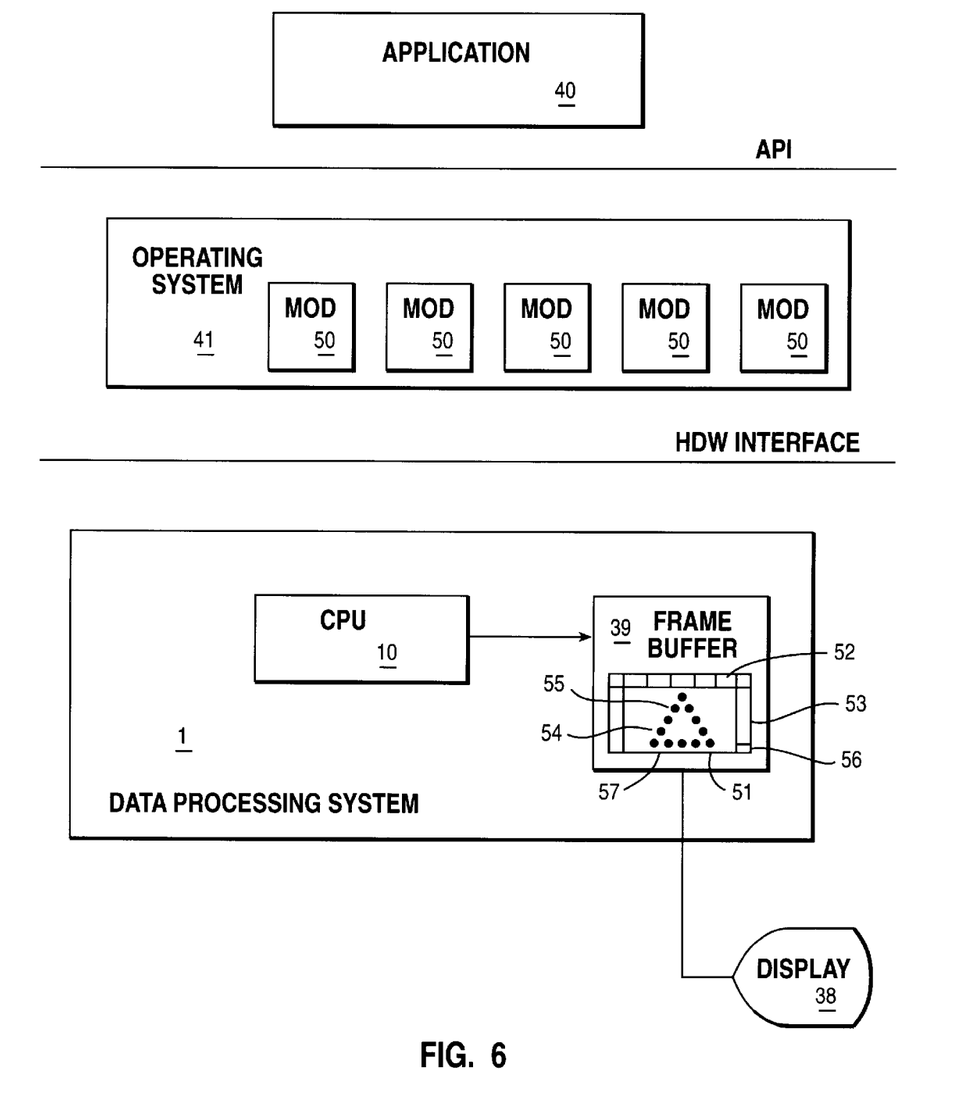
FIG. 6 is an architectural diagram of the various components which implement the present invention.

Referring to FIG. 6, an architectural block diagram is shown with application 40 running on top of an operating system 41. Application 40 may include one of the word processing applications, such as WordPerfect, Word, WordPro, or the like. Application 40 interacts with an operating system 41 through an application programming interface (API). Operating system 41 may include one of the Window's operating system from Microsoft Corporation, as well as OS/2 from the IBM Corporation. Application 40 calls various functional routines included within operating system 41. These routines are shown as modules 50 included in the operating system. In the case of the Window's operating system, modules 50 can be characterized as dynamic link libraries (DLLs) which interpret a call from the application 40 and then, in response thereto, perform the desired function. For example, application 40 may issue a draw triangle command. Operating system 41 then routes this command to the appropriate module 50 that performs the draw triangle function. The appropriate module 50 then outputs hardware instructions to data processing system 1 to implement the draw triangle command. Operating system 41 and data processing system 1 interact through a hardware interface. A compiler outputs the hardware instructions to the data processing system 1, particularly central processing unit 10 where the instructions are decoded and executed on various processing, or execution units in the CPU (not shown).

As noted in FIG. 1, data processing system 1 includes a frame buffer 39 located in display adapter 36. Frame buffer 39 is a storage device which holds information relating to each picture element (pixel) of a display screen 38. The information in frame buffer 9 corresponding to each individual pixel will cause that pixel to be painted, with a particular color or shade. The information stored in frame buffer 39 is then provided to a monitor 38 for display to a user of the data processing system.

In particular, frame buffer 39 may store information relating to a window 51 to be rendered on display 38. Conventional window 51 would include elements such as a title bar 52, border 53, sizing element 56 such as an arrow, and the like. Next, the triangle 54 is shown displayed inside of window 51 by illuminating pixels 55 to form the shape of a triangle as requested by application 40. The present invention provides a window in the form of a real world object which does not include borders 53, title bar 52 and frame 57 of window 51.

In typical graphical user interfaces (GUIs), everything is presented in window form. In these GUIs, a window can consist of rectangular items including a size border, rectangular client, menu and title bar. The rectangular client is typically a window such as the object window 131 previously described with regard to FIG. 3. The preceding items are not found in real world objects such as telephone, book, fax machine, or the like that sits upon a user's desk. Ideally, real world objects appearing on a GUI desktop should be as similar to what is found in real life as possible.

Figure 5C:
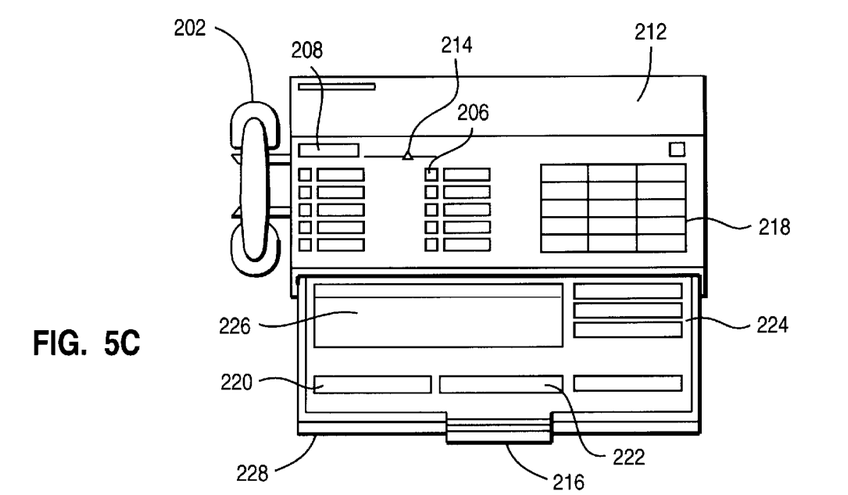

Returning to FIG. 5C which is a representation of a real world object, such as a telephone as previously described. The present invention will now be described using the real world object of FIG. 5C as an example. However, it should be understood that many other software objects can be used and are contemplated by the present invention. In the telephone object of FIG. 5C, a mechanism is used which will associate a person's name and a phone number with a speed dial button 206. As previously noted, the user enters the person's name and number into fields 220 and 222, respectively when setting the speed dial function. More particularly, the user enters the person's name into field 220 and number into field 222 to add this data to the list of names and numbers currently known to the program. The name and number will then be shown in field 226 which is a list box, or the like. A user then selects the item, i.e. the name and associated number, which is to be associated with a speed dial button 206. The user then selects a set speed dial button, which may be one of the buttons 224 as shown in FIG. 5C. At this time, all of the speed dial buttons 206 begin flashing. It should be noted that in FIG. 5C the object shows nine speed dial buttons 206 and a button associated with user comments. However, it should be understood that any configuration and number of buttons could be utilized and the object will remain within the scope of the present invention.

Subsequent to the selection of the set speed dial button, all of the speed dial buttons 206 begin flashing (change their state). This is accomplished through an inverting of the normal painted button 206. More particularly, the pixels representing the buttons 206 in frame buffer 39 are alternately illuminated and then ignored in order to give the flashing appearance. A time period is then begun wherein if the user presses one of the flashing speed dial buttons 206 it is updated to indicate the associated name and number. That is, a flashing speed dial button is associated with specific data (in this case, the name and number of the person to be called using the speed dial function). This name and number will be associated with whichever flashing speed dial button 206 that the user has selected. Thus, it can be seen that a button, or selection point, 206 which appears to be flashing is associated with a particular set of data which is used to indicate the name and telephone number of a person to be called by the user with the speed dial function of the object shown in FIG. 5C. It can be seen that a telephone object with flashing buttons will give the object an appearance different from the telephone having buttons that are not in a flashing state.

However, if after the time period has elapsed (e.g. 10 seconds), the selection points 206 will cease flashing and return to their normal function of a speed dial button. Thus, it can be seen that buttons 206 will be associated with greater than 1 sets of data to perform multiple functions. More particularly, when buttons 206 are functioning as speed dial buttons, they will be associated with data required to complete a telephone call. This data includes arbitrating for ownership of a system bus in order to control a modem, or other network device, attached to the data processing system. Next, protocols will need to be issued in order to communicate with the modem and cause it to dial the user's specified telephone number. Therefore, the telephone object of FIG. 5C and particularly, the speed dial buttons 206 are an exemplary mechanism where a portion of an object indicates different functions and different associated data structures even though the object (speed dial button 206) remains the same.

Figure 7:
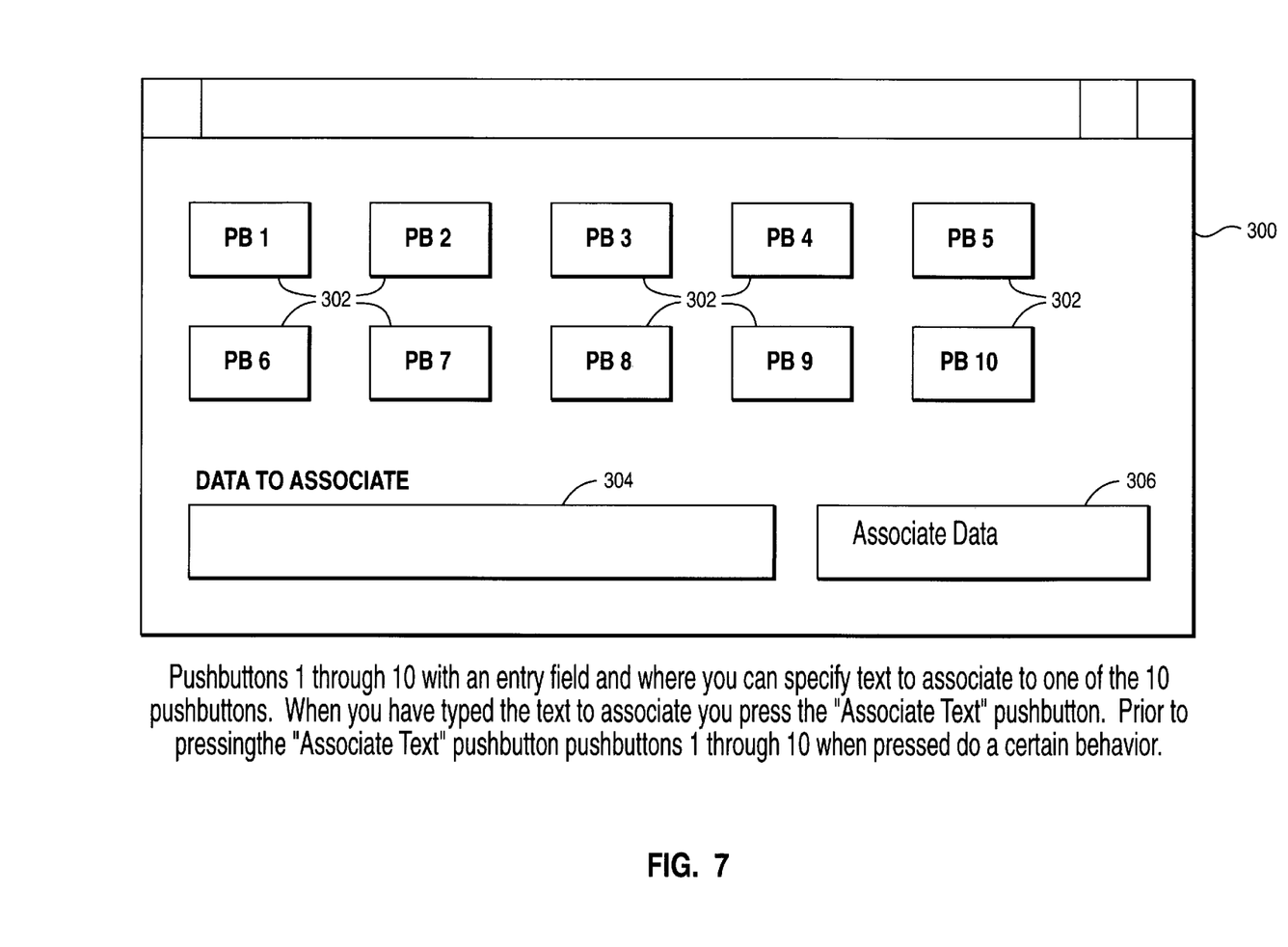
FIG. 7 is a mechanism for associating data with an object in accordance with the present invention.

Referring to FIG. 7, a mechanism is shown which associates information, including data and commands, with a particular object. It should be noted that many such mechanisms could be used by one skilled in the art to make this association and the particular implementation shown in FIG. 7 is merely an example. The association mechanism 300 is shown in the form of a window, but could be represented as another real world object such as a notepad, or the like in the same manner that real world object 210 has been shown and previously described.

Mechanism 300 includes a plurality of pushbuttons 302. In this example there are 10 such pushbuttons shown as PB1 thru PB10. In an initial state, buttons 302 are associated with a first set of data that performs a first function or operation. For example, pushbuttons 302 could be used as speed dial buttons, as previously described. When being used as speed dial buttons, the data associated with a particular pushbutton 302, e.g. PB1 could be a user's name and telephone number.

However, pushbuttons 302 could also be used to perform different functions such as opening files, launching an application or printing a document. An associated data field 304 is provided in mechanism 300 where a user inputs the type of data to be associated, or linked, with a particular pushbutton 302.

Figure 8:
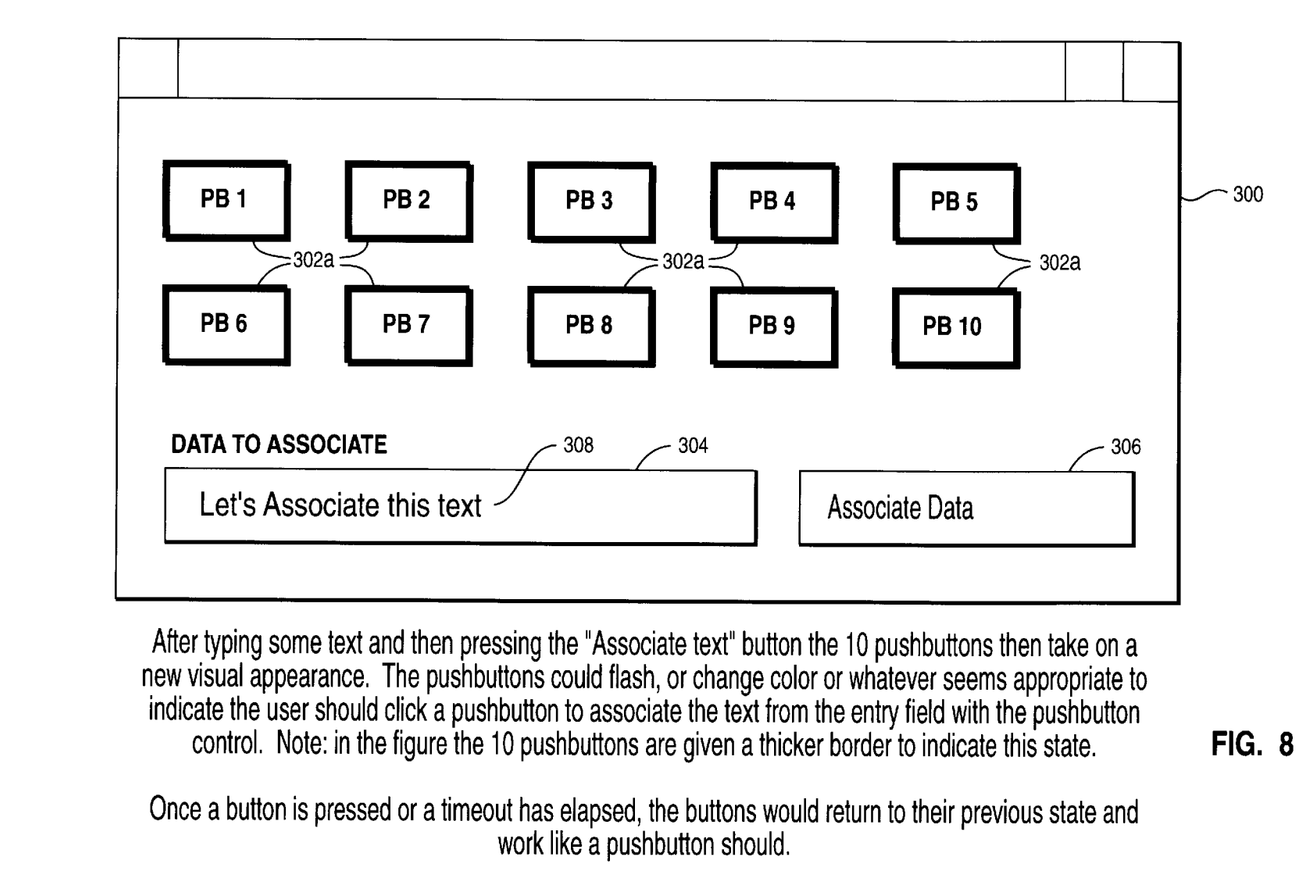
FIG. 8 is another view of the mechanism of FIG. 7 wherein the objects have a different appearance.

As shown in FIG. 8, text may be entered in field 304 and subsequently associated with a particular pushbutton. Additionally, functional instructions can also be entered to field 304 such that the system will then perform a particular command when the associated pushbutton is selected. For example, the command "word processing" could be associated with a particular pushbutton 302 such that when that particular button is selected, a batch file is invoked that will cause a word processing software application to be started. Thus, it can be seen how the pushbuttons may have various multi-functional aspects, such that various operations can be implemented, i.e. speed dialing, opening of files, printing, opening program applications, and the like.

In order to associate data and/or commands with a particular pushbutton, the user enters the specific data or text to be associated with one of the pushbuttons 302 into field 304. Once the data is entered at field 304, an associate data button 306 is selected. Upon selecting the associate data button, pushbuttons 302 then present a new visual appearance. For example, the pushbutton controls 302 could flash, change color, create a new border or some other appropriate indicator to prompt a user to select a particular button. In FIG. 8, pushbuttons 302a are the same objects as pushbuttons 302 of FIG. 7, however buttons 302a have been given a thicker border to indicate a different state. In the previous discussion relative to telephone object 210, the speed dial buttons were given a flashing appearance when they changed state. Once the user selects a particular pushbutton 302a or a predetermined time period has elapsed, pushbuttons 302a return to their previous state as shown by buttons 302 in FIG. 7 and perform the function that was set by the user.

In this manner the action of selecting a pushbutton is associated with particular data, i.e. data in field 304. Thus, the present invention associates action with one of a plurality of data structures, commands, instructions, or the like.

Again, it must be emphasized that the data 302a of field 304 in FIG. 8 is merely representative of text that could be associated with a particular pushbutton 302a, and is not a limitation of the types of functions that can be associated with these buttons. More particularly, a user may type a command into field 304 such as "begin word processing" and then select the associate data button 306. At this time, pushbuttons 302 will alter their appearance to a form as shown by buttons 302a, or the like wherein the user may select one of the ten buttons, e.g. pushbutton 1. The mechanism 300 then returns to the state as shown in FIG. 7 and when pushbutton 1 is selected, a word processing application will be launched. Similarly, a user may enter a name and telephone number of a person to be called in field 304 and select the associate data button 306. Then, the pushbuttons 1 through 10 as shown in FIG. 8 will change state and the user can once again select pushbutton 1 wherein the mechanism reverts back to the state shown in FIG. 7.

Therefore, it can be seen that not only does mechanism 300 allow pushbuttons to be used for various functions, that is, mechanism 300 can be used for speed dial functions, launching applications and the like, but also allows the pushbuttons to perform their intended function and to associate data or commands with that particular button. That is, one function performed by a pushbutton may be the action of speed dialing, or the like, while a second function may be to perform the association of data in field 304. Additionally, pushbuttons 302 may be capable of providing a plurality of appearances, i.e. normal as in button 302, wide border for button 302a and flashing for yet another function. For example, button PB1 302 may represent speed dialing, button PB1 302a may be for associating new data, commands and a flashing appearance of PB1 could be for sending a fax, or printing a document.

Figure 9:
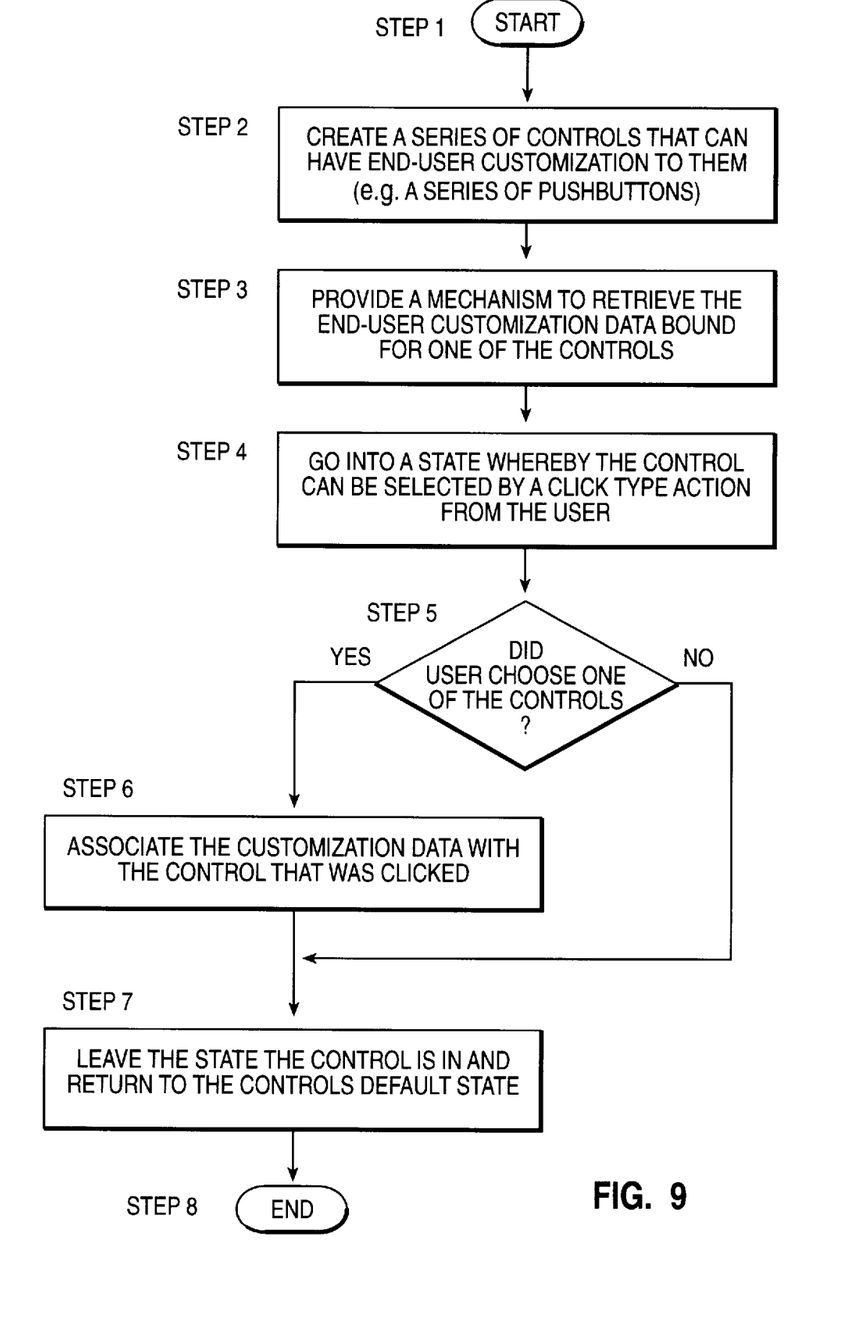
FIG. 9 is a flowchart of the process implemented by the present invention to associate different data with the same object.

FIG. 9 is a flowchart of the process implemented by the present invention to associate particular data with an object. At step 1, the process is started and at step 2 a series of controls to be customized by a user are created (e.g. pushbuttons). At step 3, a mechanism is provided to retrieve the end user customization data bound for one of the previously created controls. For example, the user entered data or commands in field 304 is retrieved. The process then continues to step 4 where the mechanism is in a state whereby the customized controls (pushbuttons) can be selected by a user using a click-type action, such as a mouse click, stylus, trackball and pointer, or the like. At step 5, it is determined whether the user did in fact choose one of the controls to associate the customization data. If no, the process continues to step 7 where the control button is left in its previous state and the mechanism returns to its default condition. However, if at step 5 it is determined that the user did choose one of the controls then the process associates, or links, the customization data or commands with the control that was selected by the user. This association can be accomplished using pointers, a look-up table, or the like. Subsequent to step 6, the process continues to step 7 where the mechanism maintains the association between the customization data and the control and the process returns to the default state. Subsequent to step 7, the process ends at step 8.

Although certain preferred embodiments have been shown and described it should be understood that many changes and modifications may be made therein without departing from the scope of the appended claims.

We claim:

1. A data processing system that displays at least one user interactable object, comprising:

means for causing said object to be displayed having a first appearance and a second appearance wherein said object comprises at least one control capable of altering its appearance between a first state and a second state;

means for associating a first function with said object having said first appearance and a second function with said object having said second appearance, said means for associating comprises means for linking first information to said object having said first appearance and second information to said object having said second appearance and means for prompting a user to enter said first and second information;

wherein a user will implement said first function by selecting said object having said first appearance, and will implement said second function by selecting said object having said second appearance.

2. A system according to claim 1 wherein said object is displayed having said first appearance when said at least one control is in said first state and displayed having said second appearance when said control is in said second state.

3. A system according to claim 2 wherein said user implements said first function by selecting said control in said first state and implements said second function by selecting said control in said second state.

4. A system according to claim 3 further comprising means for causing said object to change from said first appearance to said second appearance.

5. A system according to claim 4 wherein said first and second information includes data, instructions and commands.

6. A system according to claim 5 wherein said means for linking includes pointers and a look up table.

7. A system according to claim 6 further comprising timing means that causes said object to change from said second appearance to said first appearance after a predetermined period of time has elapsed.

8. A method of displaying at least one user interactable object, comprising the steps of:

causing said object to be displayed having a first appearance and a second appearance;

providing said object with at least one control capable of altering its appearance between a first state and a second state; associating a first function with said object having said first appearance and a second function with said object having said second appearance, said step of associating comprises the step of linking first information to said object having said first appearance and second information to said object having said second appearance and the step of prompting a user to enter said first and second information;

wherein a user will implement said first function by selecting said object having said first appearance, and will implement said second function by selecting said object having said second appearance.

9. A method according to claim 8 wherein said object is displayed having said first appearance when said at least one control is in said first state and displayed having said second appearance when said control is in said second state.

10. A computer program, having data structures resident on a computer readable media, which causes a data processing system to display at least one user interactable object, comprising:

means for causing said object to be displayed having a first appearance and a second appearance, said object comprises at least one control capable of altering its appearance between a first state and a second state;

means for associating a first function with said object having said first appearance and a second function with said object having said second appearance, said means for associating comprises means for linking first information to said object having said first appearance and second information to said object having said second appearance and means for prompting a user to enter said first and second information;

wherein a user will implement said first function by selecting said object having said first appearance, and will implement said second function by selecting said object having said second appearance.

11. A program according to claim 10 wherein said object is displayed having said first appearance when said at least one control is in said first state and displayed having said second appearance when said control is in said second state.

* * * * *